(12) United States Patent
Merhav et al.

(10) Patent No.: US 10,043,240 B2
(45) Date of Patent: *Aug. 7, 2018

(54) OPTIMAL CROPPING OF DIGITAL IMAGE BASED ON PROFESSIONALISM SCORE OF SUBJECT

(71) Applicant: Microsoft Technology Licensing, LLC, Redmond, WA (US)

(72) Inventors: Uri Merhav, Rehovot (IL); Dan Shacham, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/098,931

(22) Filed: Apr. 14, 2016

(65) Prior Publication Data
US 2017/0301063 A1 Oct. 19, 2017

(51) Int. Cl.
*G06K 9/62* (2006.01)
*G06T 3/40* (2006.01)
*G06N 3/08* (2006.01)
*G06F 17/11* (2006.01)
(Continued)

(52) U.S. Cl.
CPC .......... *G06T 3/4046* (2013.01); *G06F 17/11* (2013.01); *G06K 9/627* (2013.01); *G06K 9/6257* (2013.01); *G06N 3/08* (2013.01); *G06T 7/0002* (2013.01); *H04L 67/42* (2013.01); *G06T 2207/20081* (2013.01); *G06T 2207/30168* (2013.01); *G06T 2210/22* (2013.01)

(58) Field of Classification Search
CPC ........ G06N 99/005; G06N 3/08; G06Q 30/02; G06Q 50/01; G06T 3/4046; G06T 3/404; G06T 7/0002; G06F 17/11; G06K 9/6257; G06K 9/627; H04L 67/42
USPC ......................................... 382/159, 173, 174
See application file for complete search history.

(56) References Cited

U.S. PATENT DOCUMENTS

| | | | |
|---|---|---|---|
| 6,816,847 B1 | 11/2004 | Toyama | |
| 8,879,796 B2* | 11/2014 | Rodriguez Serrano | G06K 9/325 382/105 |
| 9,904,871 B2* | 2/2018 | Merhav | G06K 9/6257 |

(Continued)

OTHER PUBLICATIONS

"U.S. Appl. No. 15/098,906, Corrected Notice of Allowance dated Jan. 22, 2018", 4 pgs.

(Continued)

*Primary Examiner* — Mekonen Bekele
(74) *Attorney, Agent, or Firm* — Schwegman Lundberg & Woessner, P.A.

(57) ABSTRACT

In an example embodiment, an optimal cropping of a digital image is determined. A machine learning algorithm is used to generate a professionalism score for the digital image, the utilizing a machine learning algorithm comprising a training mode where a plurality of sample images with labeled professionalism scores are used to train a classification function in a model that produces as professionalism score as output; and an analysis mode where the model is used to generate a professionalism score for the digital image. Then, the professionalism score is used as an input to a discrete variable optimization algorithm to determine an optimum cropped version of the digital image from a plurality of possible cropped versions of the digital image using the classification function.

20 Claims, 18 Drawing Sheets

(51) Int. Cl.
*H04L 29/06* (2006.01)
*G06T 7/00* (2017.01)

(56) References Cited

U.S. PATENT DOCUMENTS

| | | |
|---|---|---|
| 2004/0076330 A1 | 4/2004 | Sloan et al. |
| 2005/0053150 A1 | 3/2005 | Hsu et al. |
| 2007/0025594 A1* | 2/2007 | Han ............... G06K 9/6203 382/103 |
| 2009/0060396 A1* | 3/2009 | Blessan ............ G06K 9/6212 382/317 |
| 2009/0199114 A1* | 8/2009 | Lewis ............... G06Q 30/02 715/763 |
| 2011/0013039 A1 | 1/2011 | Aisaka et al. |
| 2011/0134223 A1 | 6/2011 | Zomet et al. |
| 2011/0141259 A1 | 6/2011 | Nakano |
| 2011/0222724 A1 | 9/2011 | Yang et al. |
| 2012/0070102 A1 | 3/2012 | Yokokawa et al. |
| 2012/0294514 A1* | 11/2012 | Saunders ......... H04N 1/00196 382/159 |
| 2013/0021460 A1 | 1/2013 | Burdoucci |
| 2014/0056520 A1* | 2/2014 | Rodriguez Serrano ........... G06K 9/325 382/174 |
| 2015/0213609 A1* | 7/2015 | Lin ................. G06T 7/0081 382/173 |
| 2015/0213612 A1* | 7/2015 | Lin ................. G06T 7/00 382/173 |
| 2016/0035078 A1 | 2/2016 | Lin et al. |
| 2016/0162482 A1 | 6/2016 | Pesavento et al. |
| 2016/0179844 A1 | 6/2016 | Shen et al. |
| 2016/0358321 A1 | 12/2016 | Xu et al. |
| 2016/0379352 A1 | 12/2016 | Zhang et al. |
| 2017/0032222 A1 | 2/2017 | Sharma et al. |
| 2017/0083754 A1 | 3/2017 | Tang et al. |
| 2017/0083796 A1 | 3/2017 | Kim et al. |
| 2017/0177965 A1* | 6/2017 | Gordo Soldevila ... G06K 9/325 |
| 2017/0300785 A1 | 10/2017 | Merhav et al. |
| 2017/0300811 A1* | 10/2017 | Merhav ............. G06N 99/005 |
| 2017/0301077 A1 | 10/2017 | Merhav et al. |

OTHER PUBLICATIONS

"U.S. Appl. No. 15/098,906, Notice of Allowance dated Jan. 3, 2018", 7 pgs.

"U.S. Appl. No. 15/098,950, Examiner Interview Summary dated Apr. 2, 2018", 3 pgs.

"U.S. Appl. No. 15/098,950, Non Final Office Action dated Mar. 1, 2018", 16 pgs.

"U.S. Appl. No. 15/098,950, Response filed Apr. 23, 2018 to Non Final Office Action dated Mar. 1, 2018", 10 pgs.

U.S. Appl. No. 15/098,906, filed Apr. 14, 2016, Deep Convolutional Neural Network Prediction of Image Professionalism.

U.S. Appl. No. 15/098,950, filed Apr. 14, 2016, Optimal Image Transformation Base on Professionalism Score of Subject.

U.S. Appl. No. 15/099,077, filed Apr. 14, 2016, Dynamic Loss Function Based on Statistics in Loss Layer of Deep Convolutional Neural Network.

"U.S. Appl. No. 15/098,906, Non Final Office Action dated Jun. 29, 2017", 13 pgs.

"U.S. Appl. No. 15/098,906, filed Sep. 29, 2017 to Non Final Office Action dated Jun. 29, 2017", 12 pgs.

Le, Kang, et al., "Convolutional Neural Networks for No-Reference Image Quality Assessment", IEEE conference on computer vision and pattern recognition, (2014), 8 pgs.

* cited by examiner

US 10,043,240 B2

OPTIMAL CROPPING OF DIGITAL IMAGE BASED ON PROFESSIONALISM SCORE OF SUBJECT

TECHNICAL FIELD

The present disclosure generally relates to computer technology for solving technical challenges in machine learning. More specifically, the present disclosure relates to using performing optimal cropping of a digital image based on professionalism score of the subject.

BACKGROUND

The rise of the Internet has given rise to an increase in the use of digital images in which to convey aspects of people. One common use of digital photos is in creating a profile on social networks. More and more commonly, social networks are used to engage in professional communications and research, as opposed to personal. For example, it is common for certain social network members to create profiles listing their professional accomplishments, in a similar manner to a resume, and to direct, invite, or at least make available to potential employers to visit the social network profile. It is becoming more and more common for the member to place some photos of themselves on such member profile.

An issue that arises with the use of photos in such a professional capacity is that it can be easy for a member to use a photo on their member profile page that is not of the highest quality, either because the photographic techniques involved in taking the photo were not of the highest quality (e.g., bad lighting, poor framing of the subject, poor shading, etc.), or because the subject matter itself was lacking in some regard (e.g., the angle of the head is unusual, the clothes worn are too casual, the background scene is too casual, etc.). These problems are often caused by the fact that many digital photos are now taken using non-professional camera equipment (e.g., a smartphone) by non-professionals (e.g., the member taking a selfie, or a friend taking a quick shot). While certain technical details of a photograph can be quantified to identify the "image quality," it is difficult to extend the image quality to the somewhat more nebulous idea of "professionalism" of the image. For example, a photo may indeed be perfectly shot, with perfect lighting and shading, but the subject of the photo may be wearing a stained t-shirt instead of a suit and tie, or may be in a suit and tie but failing to look into the camera. It becomes even more challenging when recognizing that there are potentially an unlimited number of these small details about a photograph that can imply a professionalism level on the subject, and these unlimited number of small details can evolve over time as standards change, and can also change based on factors such as industry and location (e.g., wearing a t-shirt may be acceptably professional if the subject is a computer programmer working in Silicon Valley, but not if the subject is a financial advisor in New York).

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a Deep Convolutional Neural Network (DCNN) is used to generate professionalism scores for digital images. The DCNN uses information about digital images previously categorized with professionalism scores or labels indicating a level of professionalism to train the DCNN to identify relevant features of input images. Relevant features may include any features that the DCNN deems important to a determination of the professionalism (e.g., useful in calculating a professionalism score) of an input image. The DCNN is able to self-identify these relevant features, without the need for a human to predetermine which features may be important and instruct a machine learning algorithm to extract and examine such features, as is necessary in more traditional machine learning techniques. As such, the DCNN is free to identify any feature that tends to be shared among images of high professionalism, regardless of whether one would ordinarily think of such a feature as one that might pertain to professionalism. For example, while image lighting, clothing of subject matter, and angle of head may be features that one might expect to affect the perceived professionalism of a subject in an image, features such as how the image is cropped, color balance, and depth of field might not. The DCNN is able to itself determine that these features, even if they are subtle and perhaps not even detectable by a human, are important to a perception of professionalism and adjust its model accordingly.

Figure 1:
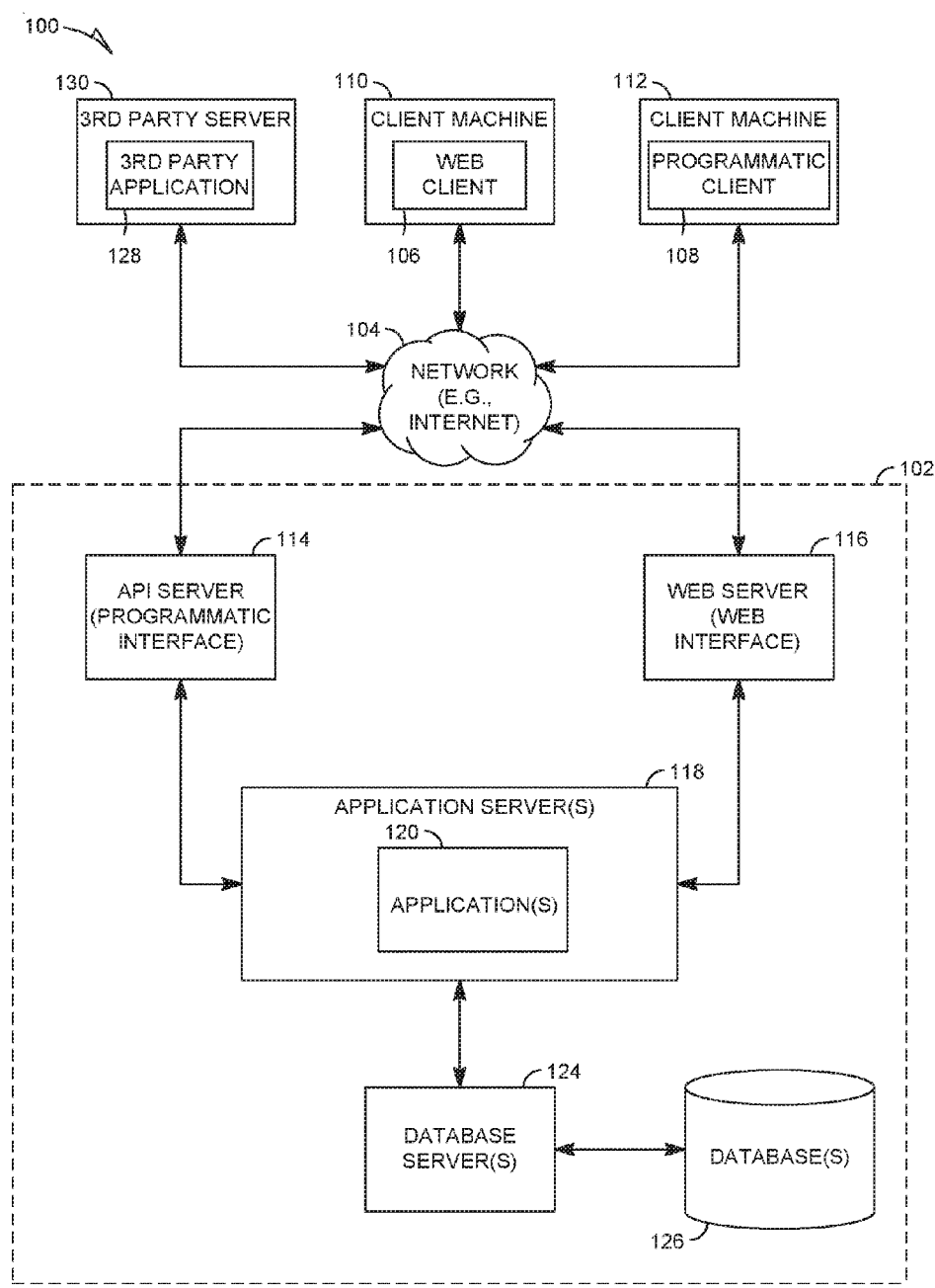
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
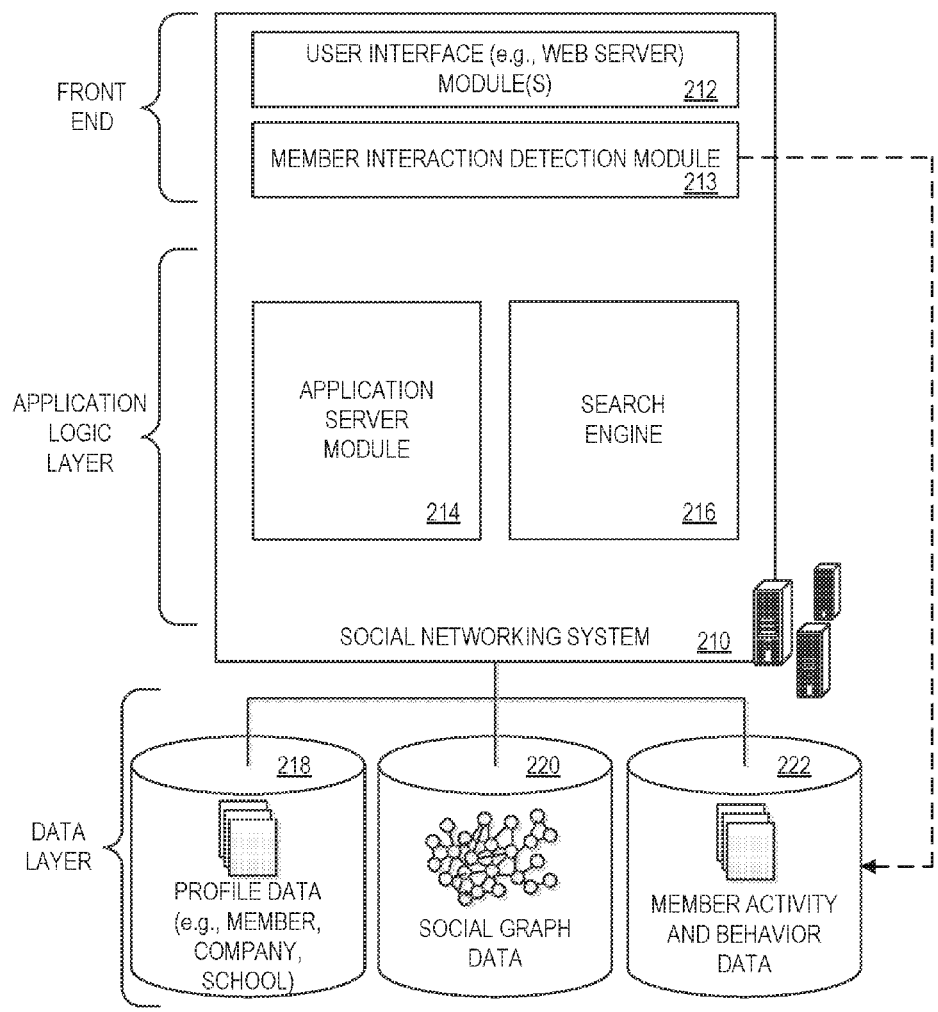
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
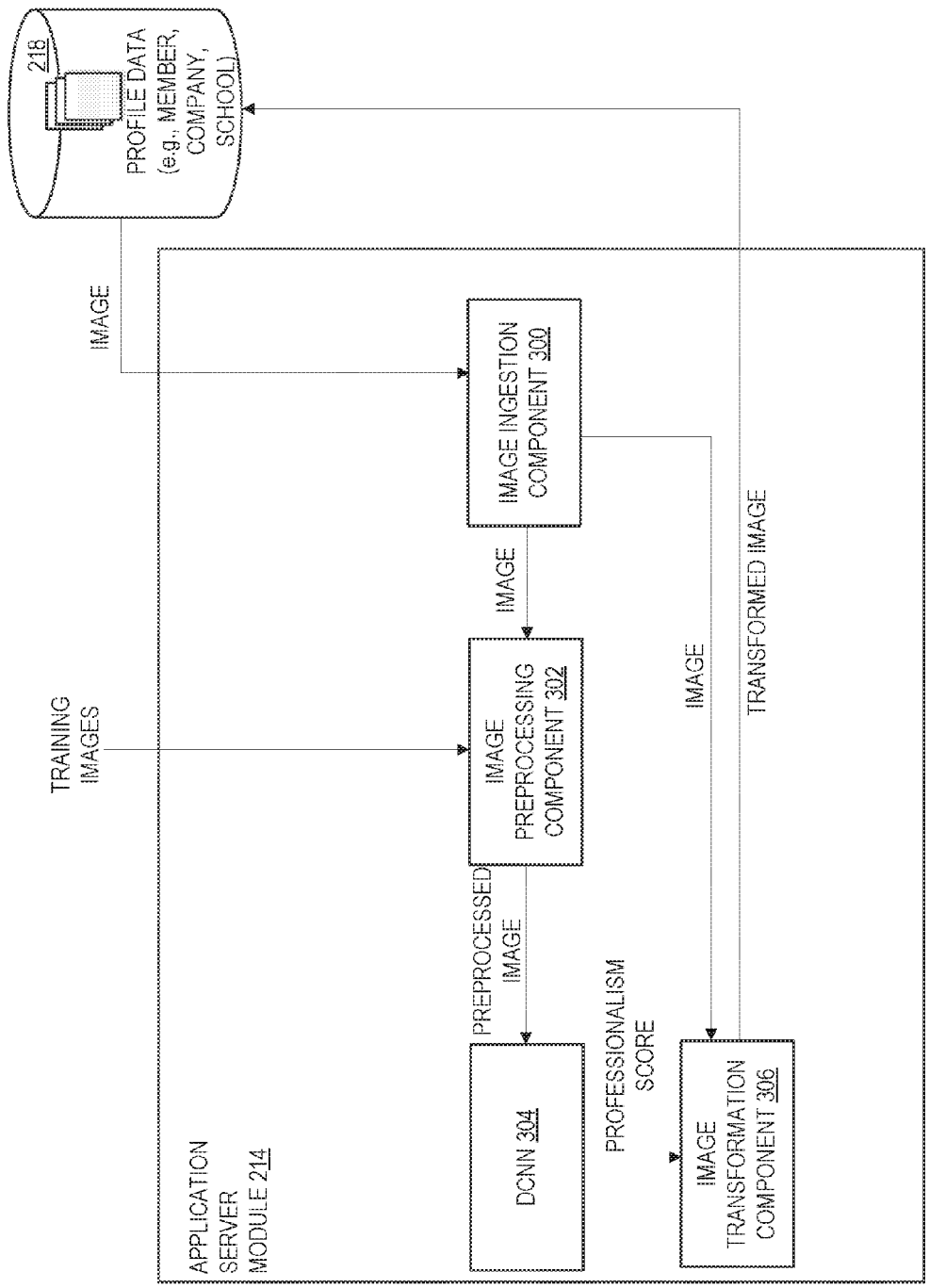
FIG. 3 is a block diagram illustrating application server module of FIG. 2 in more detail.

FIG. 3 is a block diagram illustrating application server module 214 of FIG. 2 in more detail. While in many embodiments the application server module 214 will contain many subcomponents used to perform various different actions within the social networking system, in FIG. 3 only those components that are relevant to the present disclosure are depicted. An image ingestion component 300 obtains images from profile database 218. These images may be, for example, images uploaded by members to their own member profiles. In some example embodiments, the image ingestion component 300 may obtain the images directly from the member via a user interface, rather than the images being first stored in the profile database 218.

An image preprocessing component 302 takes each image from the image ingestion component 300 and preprocesses it. This may include, as will be described in more detail below, normalizing certain aspects (such as aspect ratio, length, width, color channels, etc.) of the image. Each preprocessed image is then passed to a DCNN 304, which has been trained using training images to analyze the preprocessed image and produce a professionalism score that indicates a level of professionalism in the content of the image. This process will be described in more detail below. This professionalism score will then be used by an image transformation component 306 to transform some aspect of the image, such as cropping, rotation, lighting, shading, sharpness, and the like based on the professionalism score to improve the professionalism of the subject of the image. This will also be described in more detail below. The transformed image may then be stored in the profile database 218.

The DCNN 304 is a machine-learning model that effectively infers nonlinear relationships between a homogeneous input field and desired outputs, which are either categorical classes or scalars. The DCNN 304 is a model that maps inputs to outputs using a sequence of so-called convolutional layers of artificial neurons. The DCNN 304 may be trained by presenting it with a large number (e.g., greater than 10,000) of sample images and labels (e.g., "professional" or "not professional") or scores (e.g., professionalism score of 76/100) associated with the sample images. It is trained to minimize the discrepancy (or "loss") between the mode's output and the desired output. After the training, the model may be applied to new input images to produce a useful prediction of the professionalism levels of the new input images.

The DCNN 304 performs better when the input images have been normalized, and so a preprocessing operation may be performed by the image preprocessing component 302 on both the sample images and the input images to normalize them. This normalization may include, for example, altering all images to be of a consistent size (e.g., 250×250 pixels) and of consistent color channels (e.g., 3 color channels of red-green-blue). The DCNN 304 also performs better when the inputs are homogenous, meaning that the inputs have a uniform meaning (e.g., each pixel represents intensity), and neighborhood relationships in the input are well defined (e.g., pixels adjacent to each other represent physically close locations).

The DCNN 304 is designed to learn not only classifications/professionalism scores for images, but also to learn the feature hierarchy, all the ways from pixels to classifier, by defining a number of layers. The process of inference involves taking a given input, applying a sequence of mathematical functions called layers, and calculating the functions on the input images. Each layer extracts features from the output of a previous layer, and all layers are trained jointly. The layer-based architecture is why it is termed a "deep" convolutional neural network.

Figure 4:
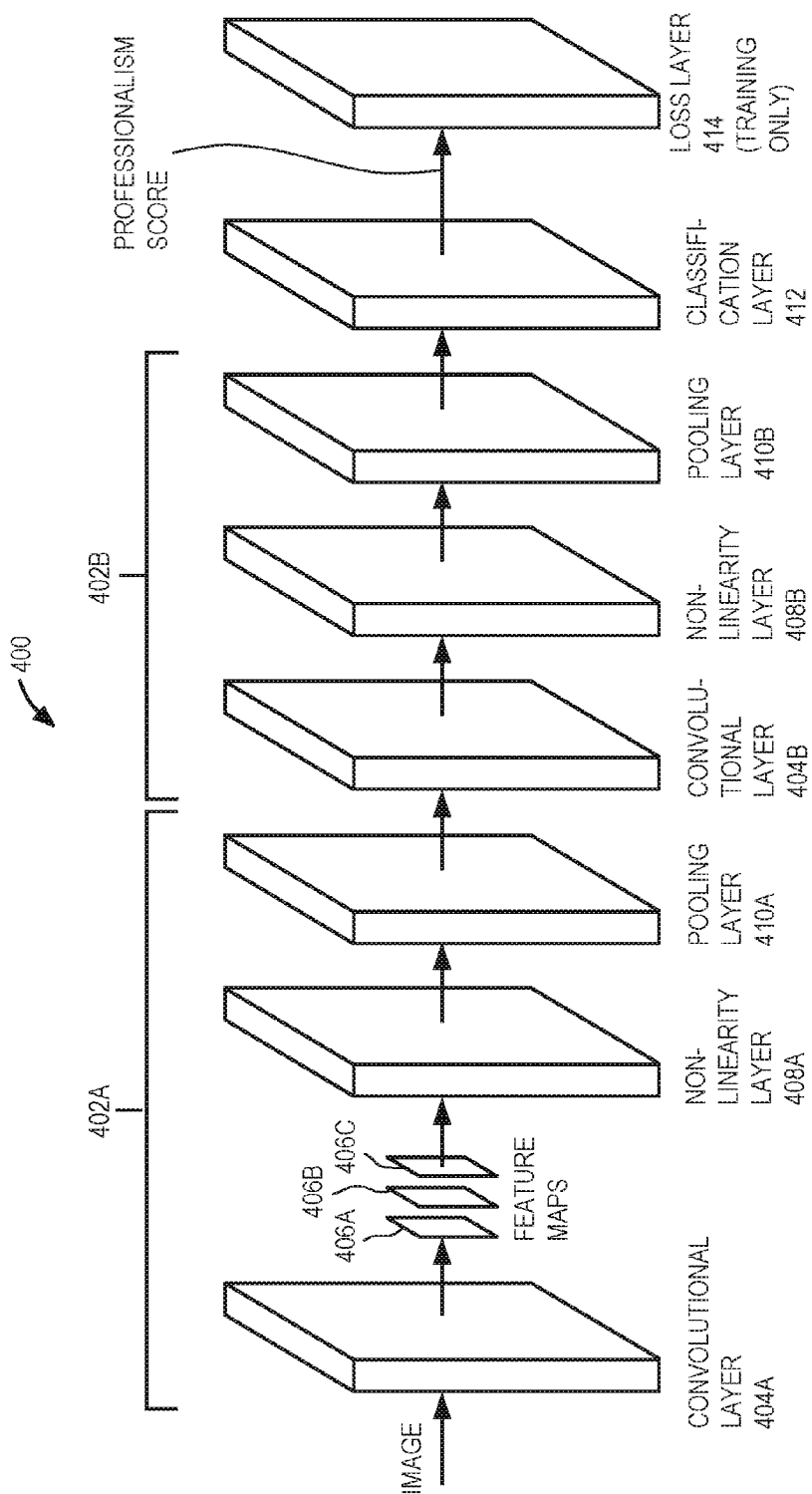
FIG. 4 is a diagram illustrating a Deep Convolutional Neural Network (DCNN), in accordance with an example embodiment.

In an example embodiment, five different types of layers are utilized. The first four layers are the convolutional layer, the nonlinearity layer, the pooling layer, and the classification layer (although the classification is just a special case of convolution followed by "softmax"). These first four layers may be considered to be a stage, and the DCNN 304 may actually be designed to have any number of these stages. Once the stages are all complete, a loss layer is used. FIG. 4 is a diagram illustrating a DCNN 400, in accordance with an example embodiment. The DCNN 400 may be, in some example embodiments, the DCNN 304 of FIG. 3. Here, two stages 402A, 402B are depicted.

The convolutional layers 404A, 404B are the core of the DCNN 400. Their parameters include a set of learnable filters that have a small receptive field, but extend through the full depth of the input image. In other words, for color images, each filter may look at a relatively small number of pixels in each image but look at all the colors in that area. During a forward pass in a convolutional layer 404A, 404B, each filter is convolved across the width and height of the input image, computing the dot product between the entries of the filter and the input and producing a 2-dimensional activation map of that filter. As a result, the DCNN 400 learns filters that activate when they see some specific type of feature at some spatial position in the input image.

The feature maps for all filters can be stacked along the depth dimension to form the full volume output of the convolutional layers 404A, 404B.

The convolutional layers 404A, 404B apply mathematical operations called convolutional. For two spatial dimensions and an indeterminate amount of non-spatial dimensions (referred to as "channels"), the convolutional is defined using the * operator as follows:

$$y[n, m, d] = x * f = \sum_{o} \sum_{j=-M, k=-N}^{j=M, k=N} x[n, m, o] f_d[n-k, m-j, o]$$

The convolutional layers 404A, 404B will typically have some very small support, e.g., N=1 and M=1, such that g[n, m, d]=0 if |n|>1 or |m|>1.

It should be noted that the filters used in the convolutional layers 404A, 404B may be activated in a first iteration of the DCNN 400 and refined prior to each additional iteration, based on actions taken in other layers in the previous iteration, until some error term is minimized below a particular threshold. In one example embodiment, this may be accomplished through back propagation, which is described in more detail below.

The output of the convolutional layers 404A, 404B are sets of arrays called feature maps 406A-406C. Each feature map 406A-406C may be produced by a different filter and modified based on various functions in each stage. For example, if the input is a color image, each feature map 406A-406C may be a two-dimensional array some aggregation of all color channel information. At the output, each feature map 406A-406C represents a particular feature extracted at all locations on the input and conditioned. The example in FIG. 4 is of a two-stage system, although one of ordinary skill in the art will recognize that more or fewer stages could be used while still being consistent with the present disclosure, and indeed as will be seen in an example embodiment, the number of stages may be dynamically determined at runtime to optimize results.

The nonlinearity layers 408A, 408B give the DCNN 400 greater expressive power in uncovering nonlinear relationships between input and output. Many different nonlinearities could be used in the nonlinearity layer, including sigmoid, tan h, and rectified linear function. For brevity, one example of nonlinearity will be described here: the rectified linear function. This function is defined by the following:

$$y(x) = \begin{cases} x & \text{if } x > 0 \\ 0 & \text{if } x < 0 \end{cases}$$

The pooling layers 410A, 410B are applied to lower the input image's spatial dimensions while preserving some information from the input image. In other words, the pooling layers 410A, 410B do not actually do any of the learning, i.e.: they're a fixed predefined operation that doesn't change as training progresses—but instead they are used the spatial dimensions of the problem. In one example embodiment, a decimation approach could be followed, where one out of every N samples along a spatial dimension is kept out. In another example embodiment, some local statistics may be used for pooling, such as max pooling, defined as:

$$Y[n, m, d] = \max_{|n'|<N, |m'|<M} x[n+n', m+m', d]$$

where N=M=2.

When all the stages 402A, 402B are complete, a classification layer 412 is used to classify the image using the output of the final pooling layer 410B. As stated above, the classification layer 412 is actually a specialized convolutional layer containing a filter designed to produce the classification score from the volume output of the final pooling layer 410B. This filter applies a classification function having weights that may be refined in the same manner as the weights in the functions of the filters of the normal convolutional layers 404, 404B.

Back propagation involves calculating a gradient of a loss function (defined later) in a loss layer 414, with respect to a number of weights in the DCNN 400. The gradient is then fed to a method that updates the weights for the next iteration of the training of the DCNN 400 in an attempt to minimize the loss function, which uses a different plurality of sample images (unless there is a need to repeat, such as running out of sample images). Back propagation uses the labeled sample images in a batch of sample images that have been passed through the stages 402A, 402B in order to calculate the loss function gradient for the samples as a group (although, as will be seen later, the loss function may be modified dynamically to eliminate some of the samples from consideration).

Back propagation may include two aspects: propagation and weight update. In the propagation aspect, forward propagation of a training pattern's input images is performed through the DCNN 400 in order to generate the propagation's output activations (i.e., the images are passed through the stages 402A, 402B). Then, backward propagation of the propagation's output activations are performed through the DCNN 402 using a target specified by the training pattern in order to generate the deltas of all output.

In the weight update aspect, for each weight of each filter, the output delta and input activation are multiplied to obtain the gradient of the weight, and then a ratio of the gradient is subtracted from the weight. The ratio influences speed and quality of learning. The higher the ratio, the faster the training, but at the expense of accuracy.

Thus, these two aspects, including both the forward pass and the backward pass through the stages 402A, 402B are performed repeatedly until the error rate is below a particular threshold. An example of back propagation algorithms compatible with the DCNN 400 include, for example, gradient descent.

The use of the back propagation may be predicated on whether or not the combined error of the classification of the images in the batch of labeled sample images transgressed a preset error threshold. If the combined error is too great, then back propagation should occur to update and hopefully minimize the error for the next iteration, and a next iteration is performed with a subsequent batch of labeled sample images, until the combined error does not transgress the threshold.

As described above, the labeled output may be a professionalism score for the image, or may be a categorical variable (e.g., high professionality, medium professionality, or low professionality). In the former, the DCNN 400 outputs a vector that may be compared to the desired output of some loss function, such as the sum square error function:

$$\text{loss} = \sum_i (\hat{l}_i - l_i)^2$$

For classification problems, the possible N output categories may be enumerated as integers, and the desired output may be represented as a binary feature vector, such as (0, 1, 0 . . . 0) to represent output label l=2. Thus, for classification problems, the DCNN is trained to output a vector which represents the probability of every class, and some probabilistic loss function, such as the known entry cost function, may be used as follows:

$$\text{loss} = \sum_i l_i \log(\hat{l}_i) + (1 - l_i)\log(1 - \hat{l}_i)$$

where $\hat{l}_i$ is the CDNN's output for the i'th element, and $l_i$ is 0 for all I except the correct category.

Figure 5:
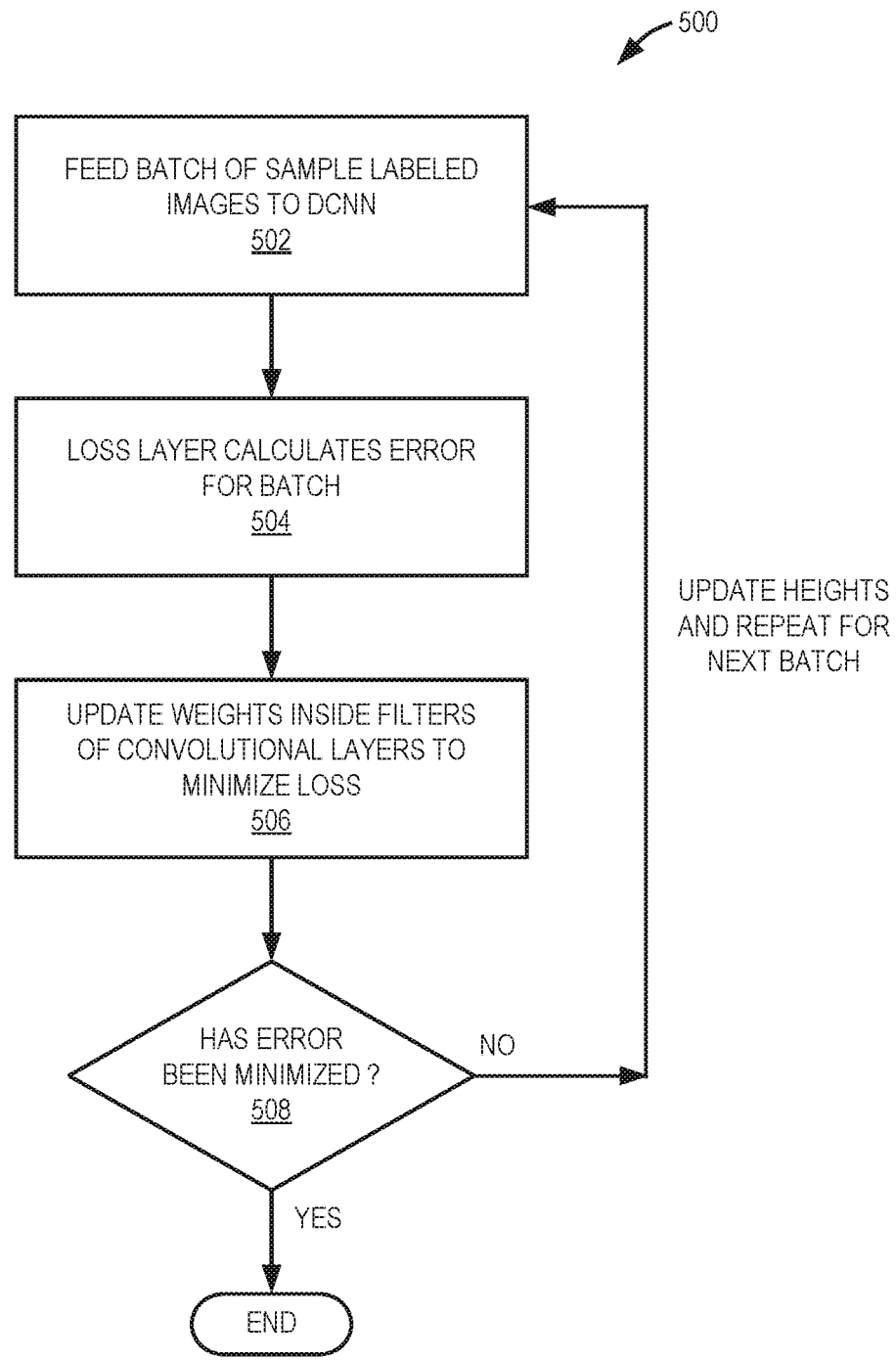
FIG. 5 is a flow diagram illustrating a method of training a DCNN, in accordance with an example embodiment.

As described above, the process of training the DCNN 400 includes a number of different operations. FIG. 5 is a flow diagram illustrating a method 500 of training a DCNN 400, in accordance with an example embodiment. At operation 502, a batch of sample labeled images are fed to the DCNN 400 and the current model of the DCNN 400 produces an output. This output may be, for example, a classification of professionalism or a professionalism score for each sample labeled image. At operation 504, the loss layer 414 of the DCNN 400 calculates the error for the batch of sample labeled images. This error may be, for example, a combination of the individual errors for each of the individual sample labeled images. At operation 506, weights inside the filters in the convolutional layers 404A, 404B (which also include the classification layer 412) are updated to minimize the loss, in accordance with the loss function defined in the loss layer 414. At operation 508, it is determined if the error has been minimized, based on a defined validation set. This defined validation set may include an error threshold, and if that error threshold has been transgressed, then the error has not been minimized and the process repeats back to operation 502 for the next batch of sample labeled images. If the error has been minimized (the threshold has not been transgressed), then the DCNN has been trained.

In an example embodiment, the defined validation set is based on a stochastic gradient descent (SGD) function. SGD comprises the following steps:

1. Randomly select a small number of samples from the training set;
2. Feed the selected samples through all the layers 406-412 in the DCNN 400 until the current error is calculated for each feature map 406A-406C;
3. Update the weights in the convolutional layer 406 with a gradient descent rule:

$$w_{new} = w_{old} - \alpha \nabla \text{error}(w_{old})$$

where w is the weight.

Figure 6:
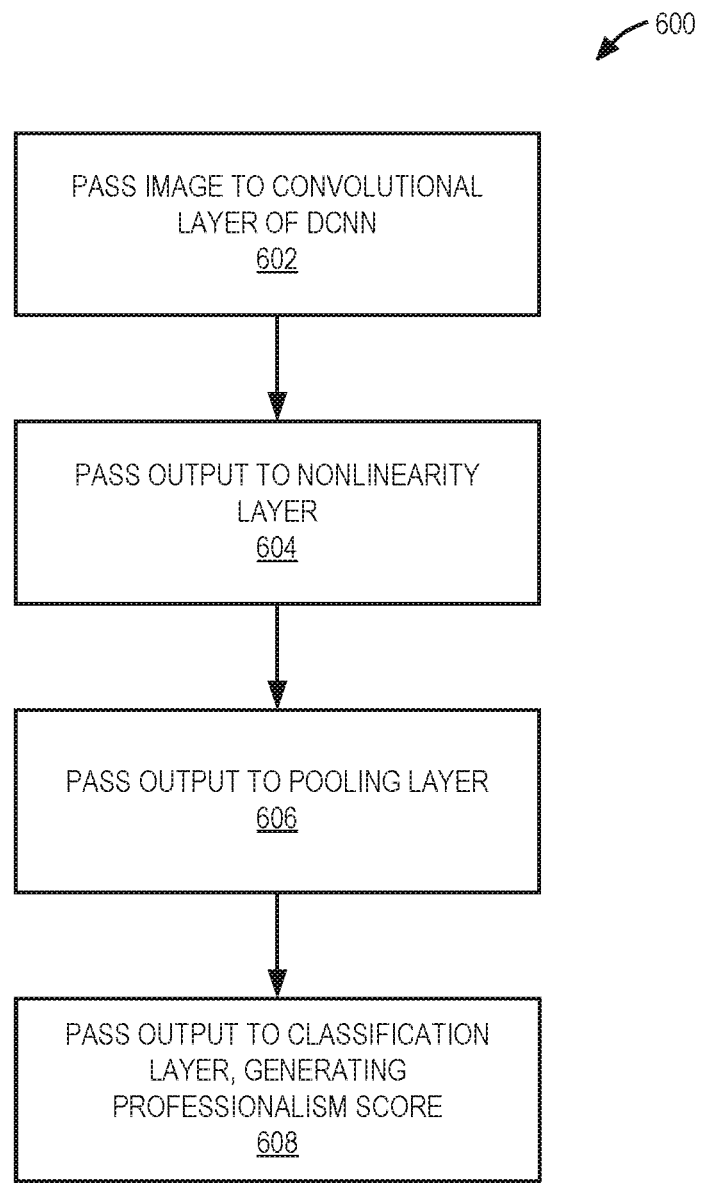
FIG. 6 is a flow diagram illustrating a method of assigning a professionalism score to an image, in accordance with an example embodiment.

FIG. 6 is a flow diagram illustrating a method 600 of assigning a professionalism score to an image, in accordance with an example embodiment. In this context, the professionalism refers to a perceived professionalism of the subject of the image, with the subject being a human (e.g., how professional the human appears in his or her job), as opposed to, for example, the professionalism of how the subject was photographed.

At operation 602, the image is passed to a convolutional layer of a DCNN, generating output. At operation 604, the output from the convolutional layer is passed to a nonlinearity layer, generating output. At operation 606, the output from the nonlinearity layer is passed to a pooling layer, generating output. At operation 608, the output from the nonlinearity layer is passed to a classification layer, generating a professionalism score for the digital image. It should be noted that in this runtime process where a professionalism score is assigned to an unlabeled image, there is no need to utilize a loss layer (indeed, use of the loss layer would not make sense as there is no label for the image to be used to determine the error level).

Referring back to FIG. 3, the professionalism score generated by the DCNN 304 for an image may be used by the image transformation component 306 in performing one or more transformations on the image. These transformations include, but are not limited to, cropping, rotating, lighting compensation, edge enhancing filtering, blur filtering, and spatially varying blur filtering.

Figure 7:
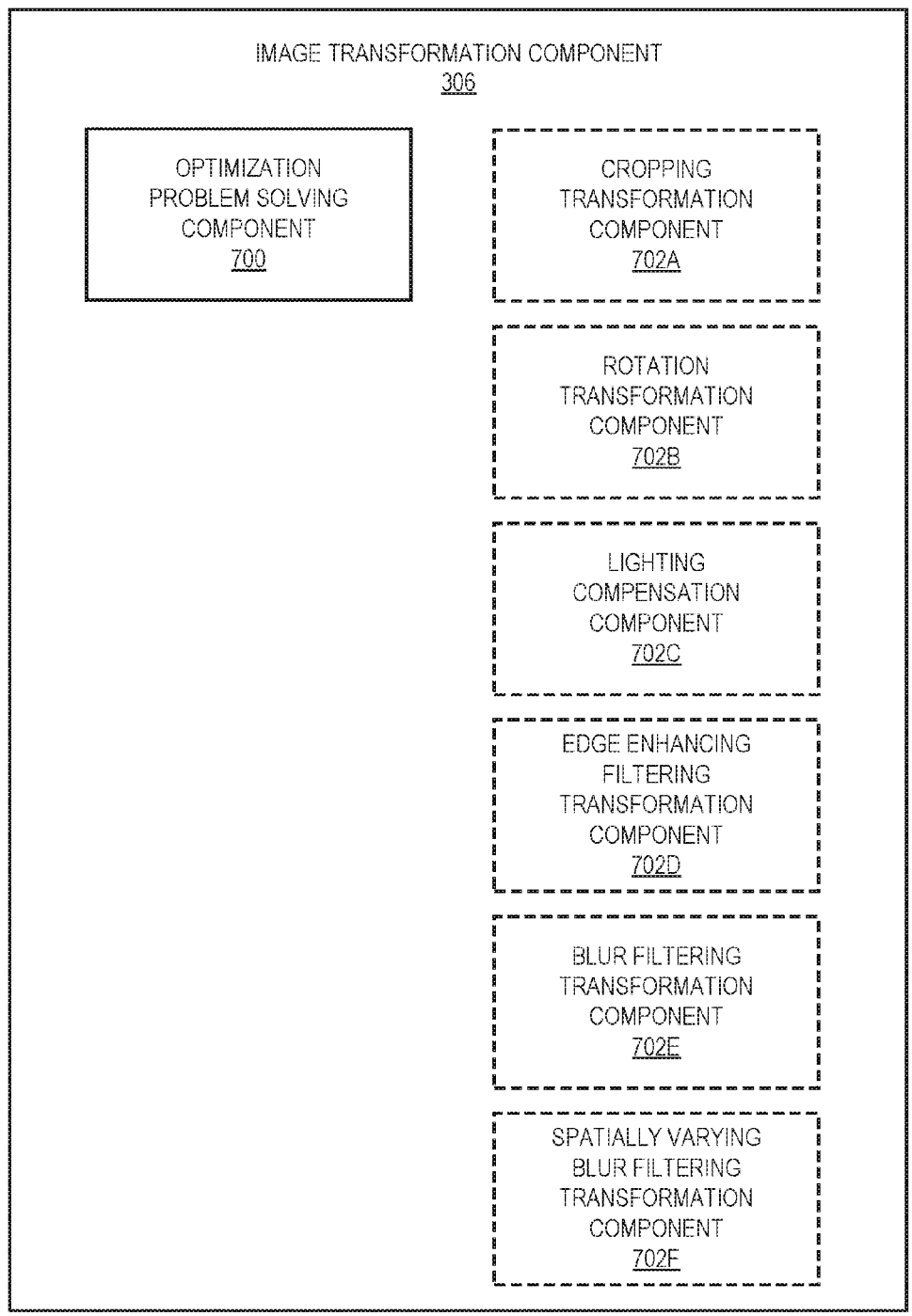
FIG. 7 is a block diagram illustrating an image transformation component in greater detail.

FIG. 7 is a block diagram illustrating an image transformation component 306 in greater detail. An optimization problem solving component 700 acts to solve an optimization problem. An optimization problem is the problem of finding a best solution from all feasible solutions. In the case of cropping, the optimization problem may be one with discrete variables, and thus is known as a combinatorial optimization problem. This is because the optimization problem attempts to find the best transformation among all the possible transformations of the input image. The optimization problem solving component 700 attempts to solve the optimization problem using an optimization algorithm. Examples of optimization algorithms for discrete variables include deterministic optimization algorithms such as Gauss-Newton, Levenberg-Marquardt, Quasi-Newton, Nonlinear Conjugate Gradient, and Step-size r, as well as stochastic algorithms such as SGD, Robbin-Monro, and decaying sequence.

For the other image transformations, a continuous optimization problem algorithm may be utilized. Examples of optimization algorithms for continuous variables include unconstrained optimization algorithms, such as derivative-free algorithms, line-search methods, gradient methods, Newton and trust region methods, and algorithms based on conjugate directions, as well as constrained optimization algorithms, such as linear optimization (pivoting algorithms and interior point methods), convex quadratic optimization, and general nonlinear optimization algorithms (duality theory, reduced gradient methods, and barrier methods).

Whatever the optimization algorithm selected, the optimization problem solving component 700 will interact with the DCNN 304 for feedback as to the effect of various different possible transformations on an image, which are defined by the various individual transformation components 702A-702F. These individual transformation components 702A-702F each apply a different type of transformation to the image, using parameters specified by the optimization problem solving component 700. In that manner, the individual transformation components 702A-702F do not need to each run every possible transformation of the appropriate type on the image. For example, it is not necessary for the cropping transformation component 702A to perform all the possible different ways to crop a particular image so that each of those possible crops can be assigned a professionalism score by the DCNN 304 so that the optimization problem solving component 700 can select the cropping that increases the professionalism score the most, but rather the optimization problem solving component 700 can select certain particular croppings having the highest likelihood of success and request only those croppings be investigated further by specifying them in parameters to the cropping transformation component 702A.

Figure 8:
FIG. 8 is a diagram illustrating an example original image that has been scored for professionalism by the DCNN, in accordance with an example embodiment.
Figure 9:
FIG. 9 is a diagram illustrating various different possible croppings attempted by the cropping transformation component, as instructed by the optimization problem solving component.
Figure 10:
FIG. 10 is a diagram illustrating a selected optimal cropping, in accordance with an example embodiment.

The cropping transformation component 702A acts to perform cropping transformations on input images, in accordance with parameters specified by the optimization problem solving component 700. FIG. 8 is a diagram illustrating an example original image 800 that has been scored for professionalism by the DCNN 304, in accordance with an example embodiment. The optimization problem solving component 700 may undertake to determine the optimal crop of this original image 800 so as to maximize the professionalism score. FIG. 9 is a diagram illustrating various different possible croppings attempted by the cropping transformation component 702A, as instructed by the optimization problem solving component 700. Each of these different possible croppings may be scored by the DCNN 304, and the optimization problem solving component 700 selects the cropping that increases the professionalism score the most. FIG. 10 is a diagram illustrating a selected optimal cropping 1000, in accordance with an example embodiment. It should be noted that while in some instances the result of the optimization problem may be the selection of an optimal cropping that is similar to what would be selected as an optimal cropping if a different parameter were being examined, such as quality of the image itself, in many cases the professionalism score will result in a completely different selection than these other types of parameters. For example, the optimal cropping for professionalism may be a tighter head shot than the optimal cropping for image quality, which might be more interested in centering the subject in the shot than on the amount of or lack of background imagery in the shot.

In another example embodiment, the automatic cropping process described above may be improved by training a separate neural net that sees a picture as an input and outputs the best rectangle from the picture. In this manner, it is not necessary to have a human annotate images for the "best rectangle." Instead, the automatic cropping process is used to find a crop that maximizes the score, and that crop is used as the "truth" that the other neural net is training for. In a sense, the output of one DCNN is used as a label for input to train a different neural net. Using this technique, it is possible for the second neural net to express learning rules such as "usually the object of interest is around the middle of the image" or "the object of interest should never be with a very small width or height." This improves performance over a process that scores rectangles without spatial context.

Figure 11:
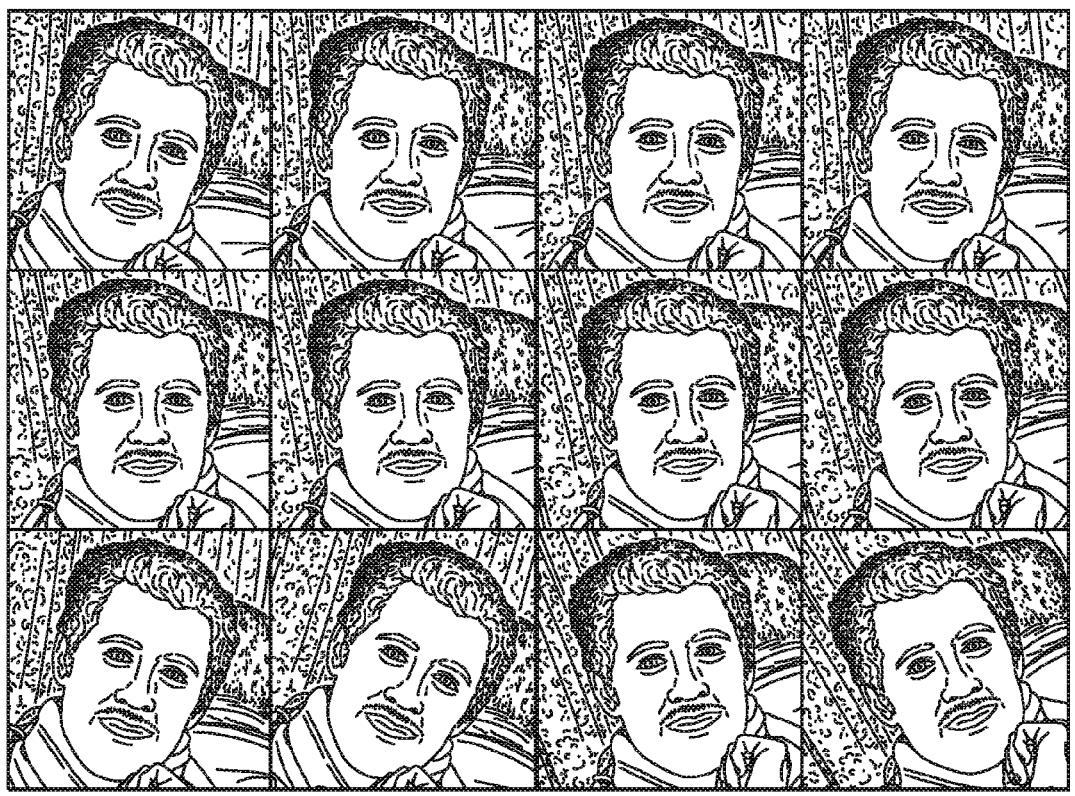
FIG. 11 is a diagram illustrating various different possible rotations attempted by the rotation transformation component, as instructed by the optimization problem solving component.
Figure 12:
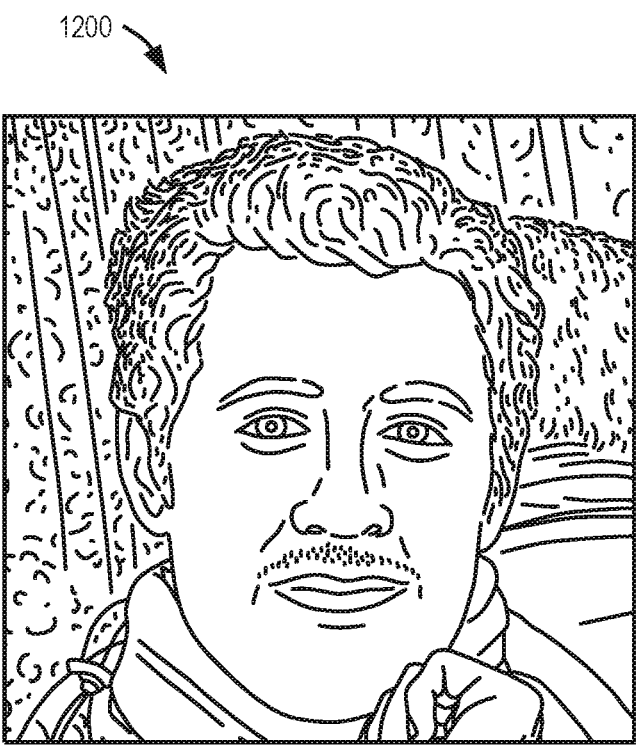
FIG. 12 is a diagram illustrating a selected optimal rotation in accordance with an example embodiment.

The rotation transformation component 702B acts to perform rotation transformations on input images, in accordance with parameters specified by the optimization problem solving component 700. FIG. 11 is a diagram illustrating various different possible rotations attempted by the rotation transformation component 702B, as instructed by the optimization problem solving component 700. Each of these different possible rotations may be scored by the DCNN 304, and the optimization problem solving component 700 selects the rotation that increases the professionalism score the most. FIG. 12 is a diagram illustrating a selected optimal rotation 1200, in accordance with an example embodiment.

The lighting compensation transformation component 702C acts to perform lighting compensation transformations on input images, in accordance with parameters specified by the optimization problem solving component 700. These lighting compensation transformations may include lightening or darkening areas of the image. The edge enhancing filtering transformation component 702D acts to perform edge enhancement filtering on input images, in accordance with parameters specified by the optimization problem solving component 700. Edge enhancement filtering enhances the edge contrast of an image in an attempt to improve its sharpness. The filter works by identifying sharp edge boundaries in the image, such as the edge between a subject and the background, and increasing the image contrast in the area immediately around the edge.

The blur filtering transformation component 702E acts to perform blur filtering transformations on input images, in accordance with parameters specified by the optimization problem solving component 700. Here, the blur filtering transformations are designed to smooth out skin texture. The spatially varying blur filtering transformation component 702F acts to perform spatially varying blur filtering transformations on input images, in accordance with parameters specified by the optimization problem solving component 700. Here spatially varying blur filtering involves blurring out the background, but not the subject.

It should be noted that while six different individual transformation components 702A-702F are depicted here, it is not necessary that all six be present in a single embodiment. Any combination of individual transformation components 702A-702F may be utilized depending on implementation. Additionally, the optimization problem solving component 700 can interact with each of the individual transformation components 702A-702F individually, or alternatively may interact with groupings of the individual transformation components 702A-702F simultaneously. For example, if the optimization problem solving component 700 wishes to determine the best combination of cropping and rotation that can be performed on the image in order to improve the professionalism the most, the optimization problem solving component 700 can interact with both the cropping transformation component 702A and the rotation transformation component 702B simultaneously to arrive at a joint result of the best cropping/rotation combination, or may interact with each individually, producing an independent answer for best cropping and for best rotation.

It should be noted that the aspects described above with respect to the image transformation component 306 need not necessarily operate in conjunction with a DCNN 304. In some example embodiments, a different machine learning component may be utilized to generate professionalism scores used by the image transformation component 306 in determining the best transformation to perform on an image.

Figure 13:
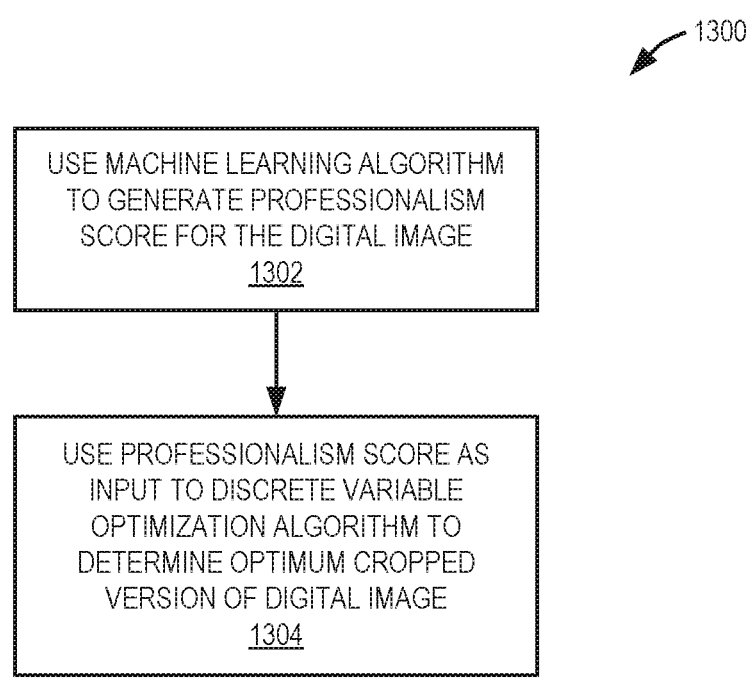
FIG. 13 is a flow diagram illustrating a method for automatically cropping a digital image to improve perceived professionalism of a subject of the image, in accordance with an example embodiment.

FIG. 13 is a flow diagram illustrating a method 1300 for automatically cropping a digital image to improve perceived professionalism of a subject of the image, in accordance with an example embodiment. At operation 1302, a machine learning algorithm is used to generate a professionalism score for the digital image, utilizing a machine learning algorithm comprising: a training mode where a plurality of sample images with labeled professionalism scores are used to train a classification function in a model that produces a professionalism score as output; and an analysis mode where the model is used to generate a professionalism score for the digital image. In an example embodiment, this machine learning algorithm may be the DCNN 304 or 400 described above, although this is not mandatory. At operation 1304, the professionalism score is used as an input to a discrete variable optimization algorithm to determine an optimum cropped version of the digital image from a plurality of possible cropped versions of the digital image using the classification function.

Figure 14:
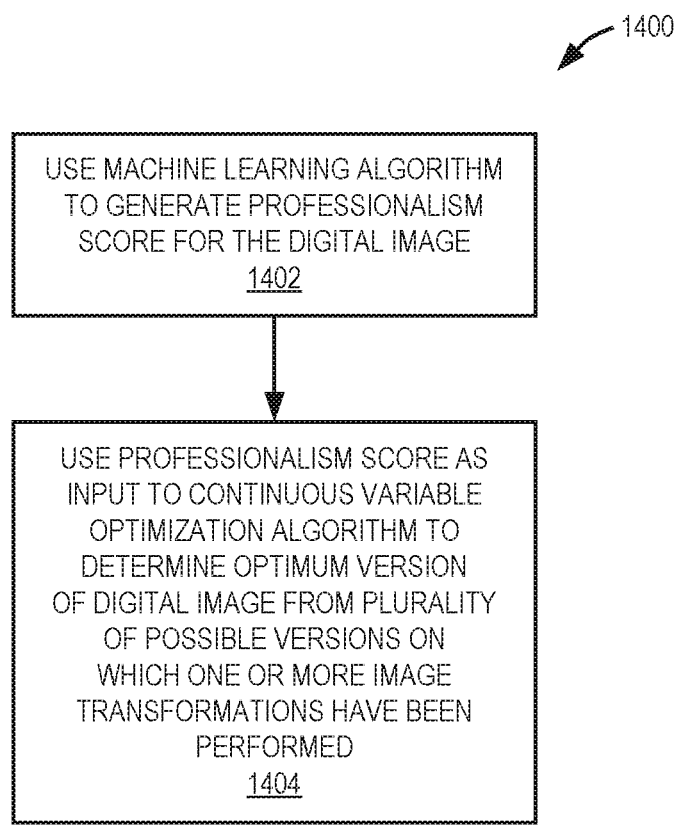
FIG. 14 is a flow diagram illustrating a method for automatically performing an image transformation on a digital image to improve perceived professionalism of a subject of the image, in accordance with an example embodiment.

FIG. 14 is a flow diagram illustrating a method 1400 for automatically performing an image transformation on a digital image to improve perceived professionalism of a subject of the image, in accordance with an example embodiment. At operation 1402, a machine learning algorithm is used to generate a professionalism score for the digital image, utilizing a machine learning algorithm comprising: a training mode where a plurality of sample images with labeled professionalism scores are used to train a classification function in a model that produces a professionalism score as output; and an analysis mode where the model is used to generate a professionalism score for the digital image. In an example embodiment, this machine learning algorithm may be the DCNN 304 or 400 described above, although this is not mandatory. At operation 1404, the professionalism score is used as an input to a continuous variable optimization algorithm to determine an optimum version of the digital image from a plurality of possible versions of the digital image on which one or more image transformations have been performed, using the classification function.

In another example embodiment, the professionalism scores produced by the model may be used to identify the best image from a group of image for a member to use as a profile picture. For example, a system may be designed to automatically browse through images on the user's device and select an image showing the member, the image selected being the one with the highest professionalism score. In some example embodiments, this may be performed by limiting the image search to images labeled "selfie" such as by being stored in a directory with the name "selfie" in it. In another example embodiment, the selfies themselves may be identified using a machine learning algorithm. This process may also be combined with one or more of the other use cases described above (e.g., cropping) to provide a high quality highly professional image for a user profile without requiring user input.

In a further example embodiment, social network information from, for example, the profile database 218 may be used in conjunction with the DCNN 304 described above with respect to the professionalism of images posted or uploaded to the social network service. Social networks often have very abundant information that can be used to aid in the training of the DCNN 304, as not only image information is available but also various pieces of information about the subject of the images is also available, such as job title, experience level, skills, age, and so forth. This information can be quite useful in aiding of labelling training images with professionalism scores or categorizations, so that a human does not need to label each image from scratch. For example, an automatic labelling component may be added to the system described above in FIG. 3 and the corresponding text to apply automatic labels to sample images based on various signals taken from a social networking profile associated with each sample image. The automatic labelling component may parse fields on the social networking profile to deduce a level of professionalism for the corresponding member, exclusive of any images. Fields that generally may be used to deduce a level of professionalism include title, skills, experience, and what types of other social networking members are linked to the social networking profile, among others. Indeed, in some example embodiments the automatic labelling component may use its own machine learning algorithm to train a model to assign a level of professionalism to social media profiles to which one or more sample images are linked. The machine learning algorithm may be selected from among many different potential supervised machine learning algorithms. Examples of supervised learning algorithms include Bayesian networks, instance-based learning, support vector machines, random forests, linear classifiers, quadratic classifiers, k-nearest neighbor, decision trees, and hidden Markov models.

It should be noted that the automatic labelling component may simply make a recommendation to a classifier as to a label to apply to an image. In some example embodiments, the classifier may still need to approve the recommendation in order for it to be applied to the image, and the classifier may override the recommendation.

While the automatic labelling component can use information from the social media profiles to improve labelling, the social media profiles often can be rife with outliers and incorrect information (e.g, members claiming to be 130 years old, merely because they didn't want to bother putting in a birthdate). This gives rise to a need to automatically ignore such outliers during training and zoom in on a correct solution in a robust way that does not require human handling to exclude the outliers. It may also be difficult for the automatic labelling component to compensate for these errors, or otherwise be modified to handle these errors.

Thus, in order to effectively filter out outliers in the context of, for example, SGD, a specialized procedure may be implemented in the loss layer 414 of the DCNN 400. As described above, the loss layer 414 might ordinarily apply a static loss function to its input. In an example embodiment, however, the loss layer 414 is modified to include a dynamically changing function that adjusts based on statistical analysis of the samples.

Figure 15:
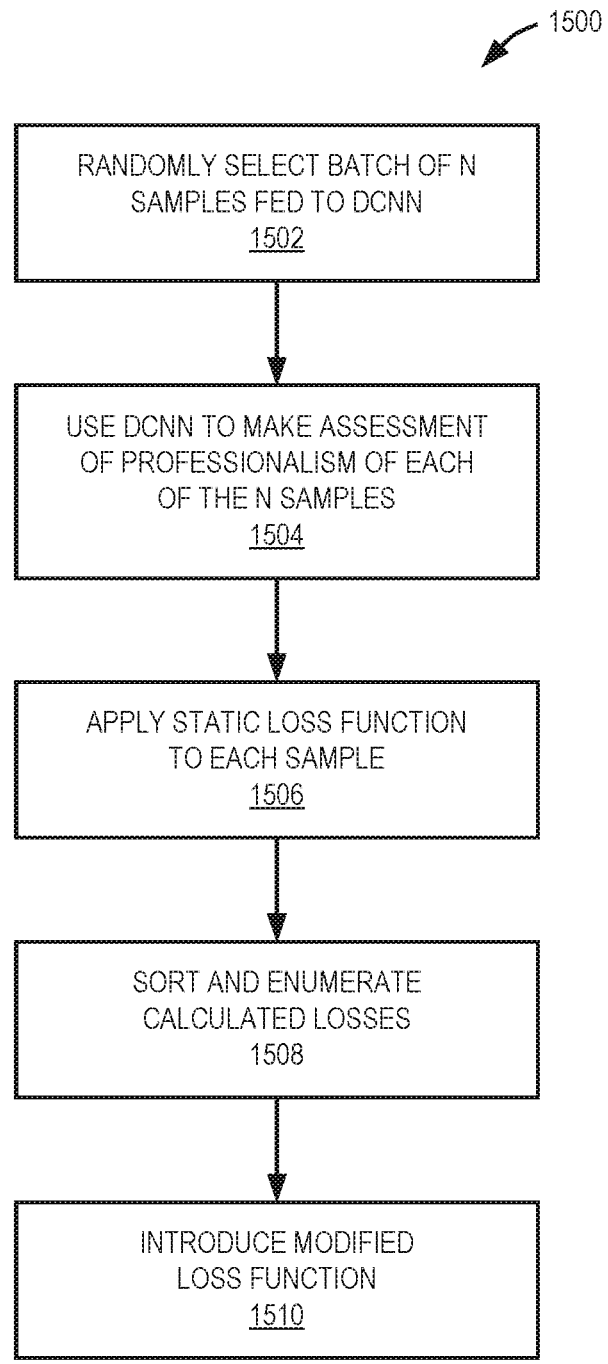
FIG. 15 is a flow diagram illustrating a method for filtering out outliers in a Stochastic Grandient Descent optimization in a DCNN, in accordance with an example embodiment.

FIG. 15 is a flow diagram illustrating a method 1500 for filtering out outliers in a SGD optimization in a DCNN, in accordance with an example embodiment. At operation 1502, a batch of N samples fed to the DCNN are randomly selected. At operation 1504, the DCNN is utilized to make an assessment of professionalism of each of the N samples. At operation 1506, for each sample, a static loss function may be applied (called loss[n]).

At operation 1508, the calculated losses are sorted and enumerated in tuples of (rank, loss). At operation 1510, a modified loss function (k(rank, loss)) is introduced that is dynamic and applied to the losses, producing (newloss[n], rank)=(k(rank, loss),rank).

In a relatively simple example, the dynamic loss function may be as follows:

k(rank,loss)=loss if rank/N>0.8,
k(rank,loss)=0 otherwise.

This would result in ignoring the top 20% worst samples in the statistics. In other example embodiments, however, the dynamic loss function may be more nuanced, applying statistical tests. For example, a Gaussian distribution of errors may be assumed, and the samples weighted by their chances of violating the Gaussian assumption. This means the mean $\mu$ and standard deviation $\sigma$ in the current batch, and the measurements may be normalized as follows:

$$z=(loss-\mu)/\sigma$$

and the samples may be weighted by their probability of not belonging to the error statistics:

$$k(loss,rank)=loss*(1-erf(z)).$$

The result is that the loss function is dynamically updated in each stage of the DCNN based on statistical analysis of which sample images showed the most deviation between their assigned professionalism score and an expected professionalism score.

As an example, assume that there are five samples per batch. In a given stage, the DCNN may output professionalism scores of (1.1, 1.2, 2.2, and 97) for the five samples, but the labels for the images were assigned as (1, 1, 2, 2, 1). If the static loss function is absolute error (prediction-correct), then the losses from the static loss function are (0.1, 0.2, 0, 0, 96). The ranking of the samples is then (3, 4, 1, 2, 5), as 5 was clearly the most imprecise in comparison to its expected value. If the simple dynamic loss function described above, which ignores the top 20% worst samples, is applied, then the dynamic loss function would filter out the result for sample 5 in the above batch, since it is among the 20% with the lowest rank. Thus, the results from the modified dynamic loss function are (0.1, 0.2, 0, 0, 0). As such, the outlying sample does not motivate any changes in the model to accommodate it.

In another example embodiment, the dynamic loss function approach may be extended by calculating the error statistics on multiple recent batches together as opposed to the current batch only. For example, N recent batches may be used for statistical purposes, with N=4. This means that the last 20 sample images are run through the algorithm above, and a ranking of the last 20 sample images is provided. Then the dynamic loss function is applied using these statistics (the rankings), but only on the most recent batch. Thus, for example, for 20 samples, the top 20% worst would be the 4 worst samples. These 4 worst samples may all come from the most recent batch, may not come from the most recent batch at all, or may partially come from the most recent batch. If they all come from the most recent batch, then four of the five samples in the most recent batch would being ignored. If none of them come from the most recent batch, then none of the five samples in the most recent batch would be ignored. If some of them come from the most recent batch, only those that are in the most recent batch would be ignored. Thus, the determination of which samples in a most recent batch to ignore by the dynamic loss function is determined based on statistic information from the last N batches, where N is greater than 1.

In another example embodiment, a schedule of stricter outlier thresholds is introduced as the training progresses (such that outliers are not ignored when the model starts learning, and progressively more aggressively ignored as the training process contains). Namely k(loss, rank, batch_i), with batch_i representing the current iteration of the training process.

It should be noted that this modified dynamic loss function approach may be taken with respect to any DCNN, and not just a DCNN being trained to output professionalism scores as described above.

Figure 16:
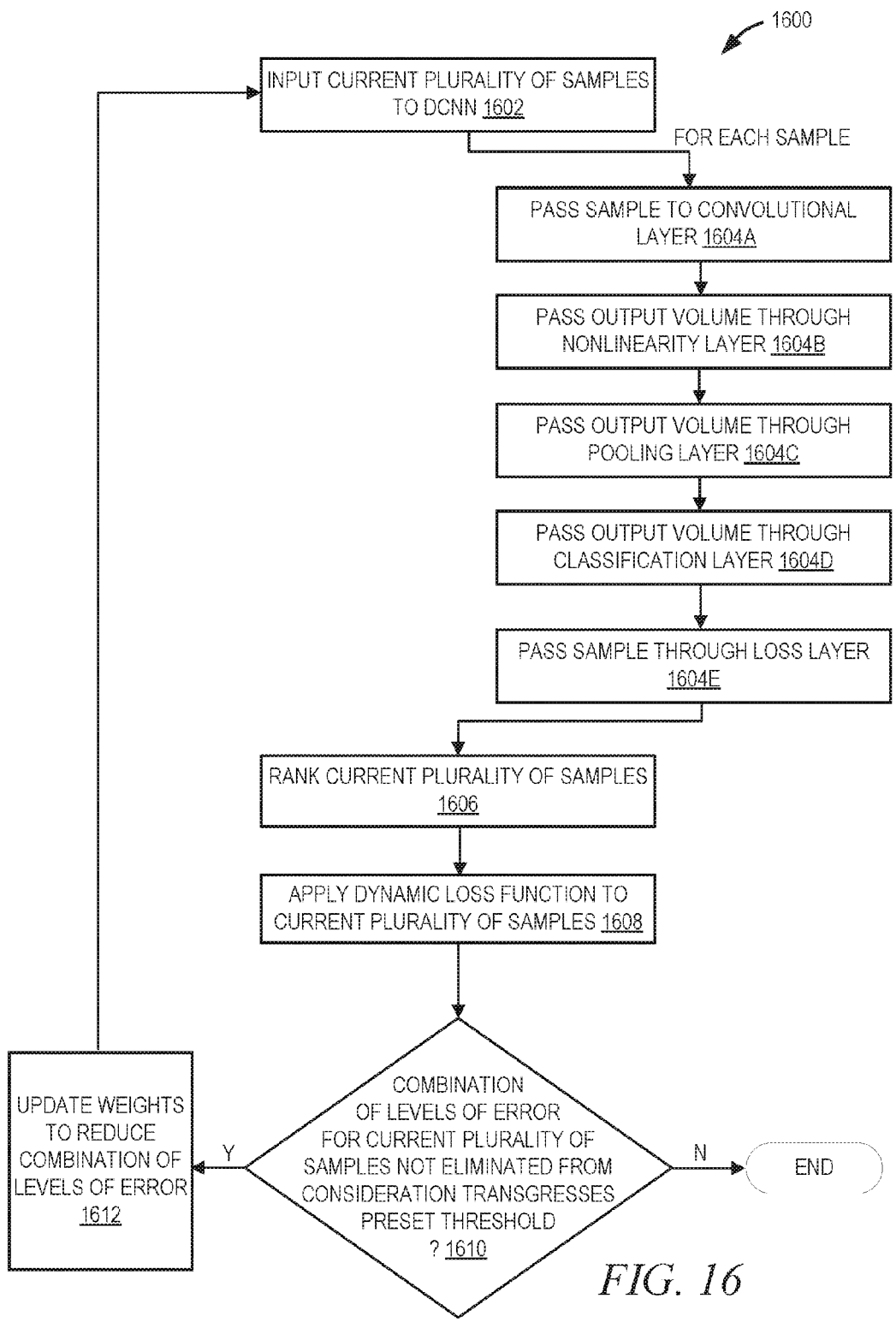
FIG. 16 is a flow diagram illustrating a method for training a DCNN, in accordance with an example embodiment.

FIG. 16 is a flow diagram illustrating a method 1600 for training a DCNN, in accordance with an example embodiment. The DCNN in this method 1600 may or may not be the DCNN 304 or 400 described above. In other words, the method 1600 may utilize a DCNN that is deigned to output a professionalism score for an image, or may utilize a DCNN that is designed to output any other sort of classification on any other type of input.

At operation 1602, a current plurality of samples is input to the DCNN, each of the samples having a label, the inputting including, for each sample, running operations 1604A-1604E. Operation 1604A involves passing the sample to a convolutional layer of the DCNN, with the convolutional layer comprising one or more filters having dynamically adjustable weights, and the one or more filters configured to filter the sample to produce an output volume for the corresponding sample, with the output volume comprising a different feature map for each of the one or more filters. Operation 1604B involves passing the output volume from the convolutional layer through a nonlinearity layer, with the nonlinearity layer applying a nonlinearity function to the output volume from the convolutional layer. Operation 1604C involves passing the output volume from the nonlinearity layer through a pooling layer, with the pooling layer lowering spatial dimensions of the output volume from the nonlinearity layer. Operation 1604D involves passing the output volume from the pooling layer through a classification layer, with the classification layer comprising a specialized convolutional layer having a filter designed to output a prediction for the sample based on the output volume from the pooling layer. Operation 1604E involves passing the sample through a loss layer, with the loss layer applying a loss function to the sample, resulting in an indication of a level of error in the prediction from the classification layer in comparison to the label of the sample.

At operation 1606, each of the current plurality of samples is ranked based on its corresponding level of error. At operation 1608, a dynamic loss function is applied to the current plurality of samples to eliminate lower ranked samples from consideration. The dynamic loss function may be based on statistics regarding the current plurality of samples, or may be based on statistics regarding a combination of the current plurality of samples and one or more previous plurality of samples used previously to train the DCNN. The dynamic loss function may be designed to become automatically stricter as more iterations of the training occur. At operation 1610, it is determined whether a combination of the levels of error for the current plurality of samples not eliminated from consideration by the dynamic loss function transgresses a preset threshold. If so, then at operation 1612, weights of the one or more filters in the convolutional layers (including the classification layer) of the DCNN are updated to reduce the combination of the levels of error. Then the method 1600 loops back to operation 1602 to repeat the training with a next plurality of samples.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-16 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 17:
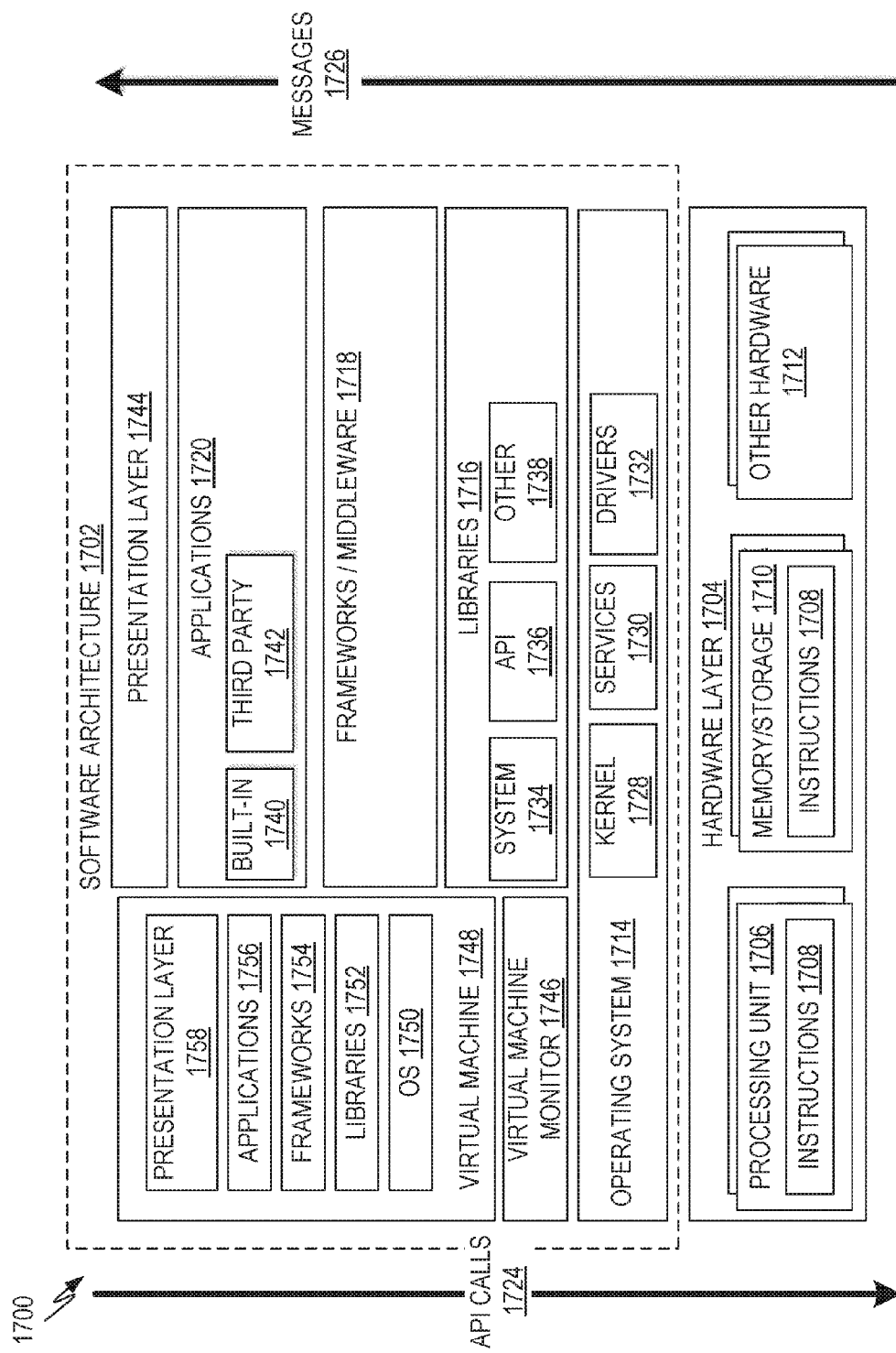
FIG. 17 is a block diagram illustrating a representative software architecture, which may be used in conjunction with various hardware architectures herein described.

FIG. 17 is a block diagram 1700 illustrating a representative software architecture 1702, which may be used in conjunction with various hardware architectures herein described. FIG. 17 is merely a non-limiting example of a software architecture, and it will be appreciated that many other architectures may be implemented to facilitate the functionality described herein. The software architecture 1702 may be executing on hardware such as a machine 1800 of FIG. 18 that includes, among other things, processors 1810, memory/storage 1830, and I/O components 1850. A representative hardware layer 1704 is illustrated and can represent, for example, the machine 1800 of FIG. 18. The representative hardware layer 1704 comprises one or more processing units 1706 having associated executable instructions 1708. The executable instructions 1708 represent the executable instructions of the software architecture 1702, including implementation of the methods, modules, and so forth of FIGS. 1-16. The hardware layer 1704 also includes memory and/or storage modules 1710, which also have the executable instructions 1708. The hardware layer 1704 may also comprise other hardware 1712, which represents any other hardware of the hardware layer 1704, such as the other hardware illustrated as part of the machine 1800.

In the example architecture of FIG. 17, the software architecture 1702 may be conceptualized as a stack of layers where each layer provides particular functionality. For example, the software architecture 1702 may include layers such as an operating system 1714, libraries 1716, frameworks/middleware 1718, applications 1720, and a presentation layer 1744. Operationally, the applications 1720 and/or other components within the layers may invoke API calls 1724 through the software stack and receive responses, returned values, and so forth, illustrated as messages 1726, in response to the API calls 1724. The layers illustrated are representative in nature and not all software architectures have all layers. For example, some mobile or special purpose operating systems may not provide a layer of frameworks/middleware 1718, while others may provide such a layer. Other software architectures may include additional or different layers.

The operating system 1714 may manage hardware resources and provide common services. The operating system 1714 may include, for example, a kernel 1728, services 1730, and drivers 1732. The kernel 1728 may act as an abstraction layer between the hardware and the other software layers. For example, the kernel 1728 may be responsible for memory management, processor management (e.g., scheduling), component management, networking, security settings, and so on. The services 1730 may provide other common services for the other software layers. The drivers 1732 may be responsible for controlling or interfacing with the underlying hardware. For instance, the drivers 1732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1716 may provide a common infrastructure that may be utilized by the applications 1720 and/or other components and/or layers. The libraries 1716 typically provide functionality that allows other software modules to perform tasks in an easier fashion than by interfacing directly with the underlying operating system 1714 functionality (e.g., kernel 1728, services 1730, and/or drivers 1732). The libraries 1716 may include system 1734 libraries (e.g., C standard library) that may provide functions such as memory allocation functions, string manipulation functions, mathematic functions, and the like. In addition, the libraries 1716 may include API 1736 libraries such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1716 may also include a wide variety of other libraries 1738 to provide many other APIs to the applications 1720 and other software components/modules.

The frameworks 1718 (also sometimes referred to as middleware) may provide a higher-level common infrastructure that may be utilized by the applications 1720 and/or other software components/modules. For example, the frameworks 1718 may provide various graphic user interface (GUI) functions, high-level resource management, high-level location services, and so forth. The frameworks 1718 may provide a broad spectrum of other APIs that may be utilized by the applications 1720 and/or other software components/modules, some of which may be specific to a particular operating system or platform.

The applications 1720 include built-in applications 1740 and/or third party applications 1742. Examples of representative built-in applications 1740 may include, but are not limited to, a contacts application, a browser application, a book reader application, a location application, a media application, a messaging application, and/or a game application. The third party applications 1742 may include any of the built-in applications as well as a broad assortment of other applications. In a specific example, the third party application 1742 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1742 may invoke the API calls 1724 provided by the mobile operating system such as the operating system 1714 to facilitate functionality described herein.

The applications 1720 may utilize built-in operating system 1714 functions (e.g., kernel 1728, services 1730, and/or drivers 1732), libraries 1716 (e.g., system 1734, APIs 1736, and other libraries 1738), and frameworks/middleware 1718 to create user interfaces to interact with users of the system. Alternatively, or additionally, in some systems, interactions with a user may occur through a presentation layer, such as the presentation layer 1744. In these systems, the application/module "logic" can be separated from the aspects of the application/module that interact with a user.

Some software architectures utilize virtual machines. In the example of FIG. 17, this is illustrated by a virtual machine 1748. A virtual machine creates a software environment where applications/modules can execute as if they were executing on a hardware machine (such as the machine 1800 of FIG. 18, for example). A virtual machine is hosted by a host operating system (e.g., operating system 1714 in FIG. 17) and typically, although not always, has a virtual machine monitor 1746, which manages the operation of the virtual machine as well as the interface with the host operating system (e.g., operating system 1714). A software architecture executes within the virtual machine 1748, such as an operating system 1750, libraries 1752, frameworks/middleware 1754, applications 1756, and/or a presentation layer 1758. These layers of software architecture executing within the virtual machine 1748 can be the same as corresponding layers previously described or may be different.

Example Machine Architecture and Machine-Readable Medium

Figure 18:
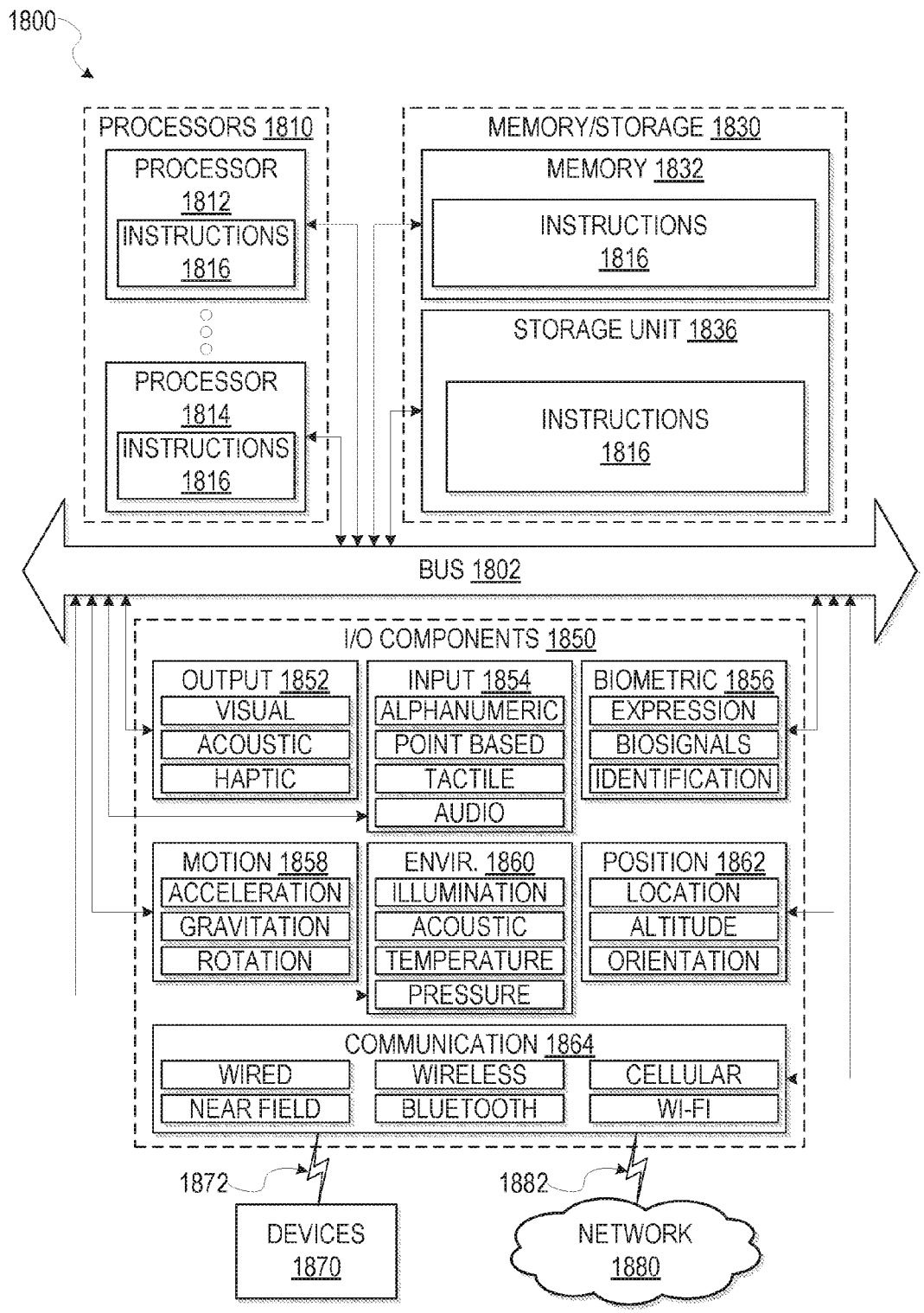
FIG. 18 is a block diagram illustrating components of a machine, according to some example embodiments, able to read instructions from a machine-readable medium (e.g., a machine-readable storage medium) and perform any one or more of the methodologies discussed herein.

FIG. 18 is a block diagram illustrating components of a machine 1800, according to some example embodiments, able to read instructions from a machine-readable medium (e.g., a machine-readable storage medium) and perform any one or more of the methodologies discussed herein. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein may be executed. The instructions transform the general, non-programmed machine into a particular machine programmed to carry out the described and illustrated functions in the manner described. In alternative embodiments, the machine 1800 operates as a standalone device or may be coupled (e.g., networked) to other machines. In a networked deployment, the machine 1800 may operate in the capacity of a server machine or a client machine in a server-client network environment, or as a peer machine in a peer-to-peer (or distributed) network environment. The machine 1800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein.

The machine 1800 may include processors 1810, memory/storage 1830, and I/O components 1850, which may be configured to communicate with each other such as via a bus 1802. In an example embodiment, the processors 1810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1812 and a processor 1814 that may execute the instructions 1816. The term "processor" is intended to include multi-core processors that may comprise two or more independent processors (sometimes referred to as "cores") that may execute instructions contemporaneously. Although FIG. 18 shows multiple processors 1810, the machine 1800 may include a single processor with a single core, a single processor with multiple cores (e.g., a multi-core processor), multiple processors with a single core, multiple processors with multiples cores, or any combination thereof.

The memory/storage 1830 may include a memory 1832, such as a main memory, or other memory storage, and a storage unit 1836, both accessible to the processors 1810 such as via the bus 1802. The storage unit 1836 and memory 1832 store the instructions 1816 embodying any one or more of the methodologies or functions described herein. The instructions 1816 may also reside, completely or partially, within the memory 1832, within the storage unit 1836, within at least one of the processors 1810 (e.g., within the processor's cache memory), or any suitable combination thereof, during execution thereof by the machine 1800. Accordingly, the memory 1832, the storage unit 1836, and the memory of the processors 1810 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1816. The term "machine-readable medium" shall also be taken to include any medium, or combination of multiple media, that is capable of storing instructions (e.g., instructions 1816) for execution by a machine (e.g., machine 1800), such that the instructions, when executed by one or more processors of the machine (e.g., processors 1810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1850 may include a wide variety of components to receive input, provide output, produce output, transmit information, exchange information, capture measurements, and so on. The specific I/O components 1850 that are included in a particular machine will depend on the type of machine. For example, portable machines such as mobile phones will likely include a touch input device or other such input mechanisms, while a headless server machine will likely not include such a touch input device. It will be appreciated that the I/O components 1850 may include many other components that are not shown in FIG. 18. The I/O components 1850 are grouped according to functionality merely for simplifying the following discussion and the grouping is in no way limiting. In various example embodiments, the I/O components 1850 may include output components 1852 and input components 1854. The output components 1852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1850 may include biometric components 1856, motion components 1858, environmental components 1860, or position components 1862, among a wide array of other components. For example, the biometric components 1856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1858 may include acceleration sensor components (e.g., accelerometer), gravitation sensor components, rotation sensor components (e.g., gyroscope), and so forth. The environmental components 1860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1850 may include communication components 1864 operable to couple the machine 1800 to a network 1880 or devices 1870 via a coupling 1882 and a coupling 1872, respectively. For example, the communication components 1864 may include a network interface component or other suitable device to interface with the network 1880. In further examples, the communication components 1864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1870 may be another machine or any of a wide variety of peripheral devices (e.g., a peripheral device coupled via a USB).

Moreover, the communication components 1864 may detect identifiers or include components operable to detect identifiers. For example, the communication components 1864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1864, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1880 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1880 or a portion of the network 1880 may include a wireless or cellular network and the coupling 1882 may be a Code Division Multiple Access (CDMA) connection, a Global System for Mobile communications (GSM) connection, or another type of cellular or wireless coupling. In this example, the coupling 1882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1816 may be transmitted or received over the network 1880 using a transmission medium via a network interface device (e.g., a network interface component included in the communication components 1864) and utilizing any one of a number of well-known transfer protocols (e.g., HTTP). Similarly, the instructions 1816 may be transmitted or received using a transmission medium via the coupling 1872 (e.g., a peer-to-peer coupling) to the devices 1870. The term "transmission medium" shall be taken to include any intangible medium that is capable of storing, encoding, or carrying the instructions 1816 for execution by the machine 1800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized method for automatically cropping a digital image to improve perceived professionalism of a subject of the image, the method comprising:
   utilizing a machine learning algorithm to generate a professionalism score for the digital image, wherein the professionalism score indicates a perceived professionalism of a human depicted in the digital image, the utilizing a machine learning algorithm comprising:
   a training mode where a plurality of sample images with labeled professionalism scores are used to train a classification function in a model that produces as professionalism score as output,
   an analysis mode where the model is used to generate a professionalism score for the digital image; and
   using the professionalism score for the digital image as an input to a discrete variable optimization algorithm to determine an optimum cropped version of the digital image from a plurality of possible cropped versions of the digital image using the classification function.

2. The method of claim 1, wherein the classification function contains one or more weights, and wherein the training of the classification function includes modifying the one or more weights.

3. The method of claim 1, wherein the discrete variable optimization algorithm is a deterministic optimization algorithm.

4. The method of claim 3, wherein the discrete variable optimization algorithm is a Gauss-Newton optimization algorithm.

5. The method of claim 3, wherein the discrete variable optimization algorithm is a Levenberg-Marquardt optimization algorithm.

6. The method of claim 1, wherein the discrete variable optimization algorithm is a stochastic algorithm.

7. The method of claim 6, wherein the stochastic algorithm is stochastic gradient descent.

8. A system comprising:
   a computer readable medium having instructions stored there on, which, when executed by a processor, cause the system to:
   utilize a machine learning algorithm to generate a professionalism score for a digital image, wherein the professionalism score indicates a perceived professionalism of a human depicted in the digital image, the utilizing a machine learning algorithm comprising:
   a training mode where a plurality of sample images with labeled professionalism scores are used to train a classification function in a model that produces as professionalism score as output;
   an analysis mode where the model is used to generate a professionalism score for the digital image; and
   using the professionalism score for the digital image as an input to a discrete variable optimization algorithm to determine an optimum cropped version of the digital image from a plurality of possible cropped versions of the digital image using the classification function.

9. The system of claim 8, wherein the classification function contains one or more weights, and wherein the training of the classification function includes modifying the one or more weights.

10. The system of claim 8, wherein the discrete variable optimization algorithm is a deterministic optimization algorithm.

11. The system of claim 10, wherein the discrete variable optimization algorithm is a Gauss-Newton optimization algorithm.

12. The system of claim 10, wherein the discrete variable optimization algorithm is a Levenberg-Marquardt optimization algorithm.

13. The system of claim 8, wherein the discrete variable optimization algorithm is a stochastic algorithm.

14. The system of claim 13, wherein the stochastic algorithm is stochastic gradient descent.

15. A non-transitory machine-readable storage medium comprising instructions, which when implemented by one or more machines, cause the one or more machines to perform operations for automatically performing optimal cropping on a digital image to improve perceived professionalism of a subject of the image, the operations comprising:
  utilizing a machine learning algorithm to generate a professionalism score for the digital image, wherein the professionalism score indicates a perceived professionalism of a human depicted in the digital image, the utilizing a machine learning algorithm comprising:
  a training mode where a plurality of sample images with labeled professionalism scores are used to train a classification function in a model that produces as professionalism score as output;
  an analysis mode where the model is used to generate a professionalism score for the digital image; and
  using the professionalism score for the digital image as an input to a discrete variable optimization algorithm to determine an optimum cropped version of the digital image from a plurality of possible cropped versions of the digital image using the classification function.

16. The non-transitory machine-readable storage medium of claim 15, wherein the classification function contains one or more weights, and wherein the training of the classification function includes modifying the one or more weights.

17. The non-transitory machine-readable storage medium of claim 15, wherein the discrete variable optimization algorithm is a deterministic optimization algorithm.

18. The non-transitory machine-readable storage medium of claim 17, wherein the discrete variable optimization algorithm is a Gauss-Newton optimization algorithm.

19. The non-transitory machine-readable storage medium of claim 17, wherein the discrete variable optimization algorithm is a Levenberg-Marquardt optimization algorithm.

20. The non-transitory machine-readable storage medium of claim 15, wherein the discrete variable optimization algorithm is a stochastic algorithm.

* * * * *